United States Patent [19]

Clark et al.

[11] 3,811,922
[45] May 21, 1974

[54] PROCESS FOR PRODUCING FOAM RUBBER-BACKED TEXTILES

[75] Inventors: Roy Clark; Donald Westfield, both of Sarnia, Ontario, Canada

[73] Assignee: Polymer Corporation Limited, Sarnia, Ontario, Canada

[22] Filed: July 10, 1972

[21] Appl. No.: 269,981

Related U.S. Application Data

[63] Continuation of Ser. No. 79,650, Oct. 9, 1970, abandoned.

[30] Foreign Application Priority Data

Nov. 5, 1969  Canada.................................. 66680

[52] U.S. Cl.................... 117/76 T, 117/80, 161/67, 161/159
[51] Int. Cl........................ B44d 1/14, D05c 15/04
[58] Field of Search......... 117/76 T, 80, 98; 161/66, 161/67, 159; 156/78

[56] References Cited
UNITED STATES PATENTS

| 2,950,221 | 8/1960 | Bauer et al. ........................... 161/67 |
| 3,383,243 | 5/1968 | DiGioia............................... 161/66 X |
| 2,586,275 | 2/1952 | Toulmin.............................. 161/159 |
| 3,506,604 | 4/1970 | Benjamin.......................... 161/67 X |

*Primary Examiner*—Ralph Husack
*Attorney, Agent, or Firm*—Stevens, Davis, Miller & Mosher

[57] ABSTRACT

In the manufacture of carpets having an attached layer of latex foam rubber, it was known to apply a precoat of a compounded liquid latex onto the underside of the carpet before applying the foamed latex layer. It has now been found that the slow drying or poor foam structure at the carpet/foam rubber interface encountered in such prior processes can be overcome by use of a foamed precoat. The foamed precoat can be applied in much smaller amounts than the prior liquid precoats.

9 Claims, No Drawings

PROCESS FOR PRODUCING FOAM RUBBER-BACKED TEXTILES

This is a continuation of application Ser. No. 79,650, filed 10-9-70, now abandoned.

This invention relates to the application of latex foam rubber backings to textile materials.

Fabrics such as carpets and upholstery coverings are available with an attached layer of foamed polymer. They are manufactured by converting suitably compounded liquid latex into a foam, applying a layer of the foamed latex onto the undersurface of the fabric, then drying and usually cross-linking the polymer in the foam. It is also known to carry out the foregoing operation after first applying a precoat to the surface to which the foamed latex is to be applied. In the case of carpets, this is mainly to anchor the tufts and increase dimensional stability. The precoat compound is customarily a liquid comprising a rubbery polymer latex highly loaded with filler and other compounding ingredients. Normally, 200 – 1000 parts of filler per 100 parts by weight of rubbery polymer in the latex with the precoat compound being applied in amounts of more than about 12 ounces of dry solids per square yard (408 grams per square meter) of fabric.

Two methods have been used to finish these precoated fabrics. In the first, the precoat layer is dried prior to application of the final foamed latex compound backing layer. This method usually consists of two separate operations and gives good structure at the interface of the foamed backing layer with the precoat but it is deficient in that undesirably long drying periods are required before the final foamed latex backing layer can be applied. For convenience, many carpet mills carry out the foregoing operation by devoting one or two days a week to the precoating operation and the remaining days to rerunning the dried precoated carpet to apply the final foamed latex compound backing layer. It can be appreciated that such operations are either slow or inconvenient and require extra handling and storage of precoated carpet. In the second method, the liquid precoat layer is applied to the underside of the carpet, the excess is scrapped off and the final foamed latex backing layer is applied over the undried or only partially dried precoat. This method permits greater throughput but suffers in that poor interfacial structure is encountered.

It has now been found that those fabric-backing operations in which a precoat is applied prior to the application of the final foamed latex compound backing layer can be greatly improved by first foaming the precoat latex compound and then applying it in its foamed state. It has been found that use of a foamed precoat instead of the prior art unfoamed liquid precoat substantially overcomes the deficiencies of the two methods described in the foregoing paragraph while retaining their good points. Thus, in the first method where the precoat layer is dried, the drying periods are greatly shortened because a much reduced amount of water needs to be evaporated since less is applied when the precoat is in a foamed state. In a drying method as applied to a once-through operation, much greater production can be obtained while retaining good interfacial structure. A drying method as applied to two passes through the equipment, the first for applying the precoat and drying and for second for applying the final foamed latex compound backing layer, will now permit greater throughput during an equivalent time for the drying step or it will require a shorter time to be used for equivalent throughput. In the second method wherein the precoat is undried or only partially dried, an improved interfacial structure is obtained for equivalent drying times because more thorough drying is obtained due to the lower weight of precoat used.

The precoat compound, which preferably contains less than 100 parts but most preferably less than 50 parts of filler per 100 parts by weight of rubber, is applied in amounts of less than 12 dry weight ounces per square yard (408 grams per square meter) of fabric surface. Preferably the foamed precoat is applied in amounts of less than 9 dry weight ounces per square yard (306 grams per square meter) of fabric, more preferably less than 7 ounces (238 grams) and most preferably 2–6 ounces per square yard (68–204 grams per square meter) of fabric.

In this specification and claims, the term "latex compound" is to be understood to mean an aqueous latex of a rubbery polymer containing at least 40 weight percent of total solids prior to being compounded and which is compounded by blending it with one or more latex compounding ingredients such as thickeners, fillers, surfactants, antioxidants, tackifiers, extenders, curatives, colorants, reodorants, etc.

When tufted carpets are being precoated, the amount of precoat latex compound required to be applied to obtain adequate fiberbundle and tuft lock can be reduced by lowering or eliminating the filler loading. The exact weight reduction of the latex compound depends on the amount of filler present, the degree of foaming and the thickness of the applied layer of foam. Application weights of 3–5 ounces per square yard of carpet are preferred when the latex compound contains no filler. This can be achieved by foaming the latex compound to 1.5–7 times its original volume and preferably 1.5–3 times its original volume before applying it. Reduction of filler usage to the small amounts specified has the added advantages of permitting better fibre/rubber adhesion between the precoat and the fabric and better rubber/rubber adhesion between the precoat and the final foam rubber backing layer.

The foaming of the latex compound may be accomplished by any suitable means known in the art, examples of which are mechanical devices for whipping air into it and the use of chemical foaming agents. The foam may be made for instance in a foaming head, with a whisk or beater or in any other suitable apparatus. The foamed compound is applied to the back of the carpet by known means such as by spraying with a paint gun, spreading with a doctor blade or by means of a lick-roller. This latter method is common in conventional carpet backing processes and is preferred.

The underside of the carpet thus coated with the foamed precoat latex compound is next exposed to a source of heat such as infrared lamps to cause evaporation of the water. The thin, low-filler-content, cellular nature of the foamed precoat layer permits a more rapid-drying of the rubber on the underside of the carpet. The rapidity of the drying is such that it is now feasible to apply the foamed precoat, heat it to dry it, apply the final foam backing layer and dry and cure it in one continuous pass through the carpet backing equipment and still obtain good interfacial structure between the foamed rubber backing layer and the precoat layer.

Latices of any rubbery polymer may be used in practising the invention. Included are natural rubbers and synthetic rubbers such as rubbery homopolymers of dienes particularly butadiene and isoprene and rubbery copolymers of the dienes with themselves or with copolymerizable ethylenically unsaturated monomers for example vinyl halides, styrenes and unsaturated acids e.g. acrylic acid and their amides, nitriles and esters as exemplified by acrylamide, acrylonitrile, methyl acrylate etc. and blends or these latices with latices of resinous polymers of the foregoing types of monomers e.g. polystyrene and high bound styrene content copolymers of butadiene and styrene including those which are carboxy modified, etc. Latices of rubbery polymers containing carboxy groups are preferred for the precoat compound since they do not require any vulcanizing agents. Carboxy-modified copolymers of butadiene with styrene or acrylonitrile exemplify these latter types. Examples of the non-carboxy rubbery polymers are homopolybutadiene, homopolyisoprene, copolymers of butadiene and isoprene with each other and with one or more of styrene, acrylonitrile, acrylic acid, methyl acrylate, and acrylamide. As indicated earlier, the latex used for the precoat compound may contain up to 100 parts of filler per 100 parts by weight of rubbery polymer, but most preferably less than 50 parts of filler. In the latex used for the final foam rubber backing layer, the foregoing restriction does not apply since the presence of large amounts of filler is usually desirable and thus the customary formulations may be used. Prior to compounding, all latices should have a rubbery polymer content of at least 40 weight percent and preferably at least 50 percent.

To illustrate the invention, two precoat latex compounds and a final latex foam rubber backing compound were prepared and applied in various combinations to a carpet. These compounds may be described as follows:

| Precoat Compound (A) | Parts Dry Weight |
|---|---|
| Latex | 100 |
| Filler (dry ground limestone) | 25 |
| Thickener (aqueous sodium polyacrylate solution) | To a viscosity of 15,000 centipoises |

The latex was a 52 percent total solids content high modulus type latex containing a rubbery carboxylated copolymer of styrene and butadiene. The total polymerized styrene content of the polymer in the latex was 62 percent by weight. Sufficient thickener was added to give a latex compound having a viscosity of 15,000 centipoises as measured with the No. 4 spindle of a Brookfield LVT viscometer rotating at 6 revolutions per minute.

| Precoat Compound (B) | Parts Dry Weight |
|---|---|
| Latex | 100 |
| Filler (as in (A)) | 250 |
| Water | To 70 weight % solids |
| Thickener (as in (A)) | To a viscosity of 20,000 centipoises |

The latex was a 52 percent total solids content latex of a carboxy-modified copolymer of styrene and butadiene containing 50 percent polymerized styrene.

| Final Latex Foam Rubber Backing Compound (C) | Parts Dry Weight |
|---|---|
| Latex | 70 |
| Potassium oleate | 1 |
| Triethyltrimethyltriamine | 1 |
| Natural rubber latex | 30 |
| Zinc diethyldithiocarbamate | 1.5 |
| Zinc 2-mercaptobenzothiazole | 1 |
| 2,2'-methylene-bis(4-methyl-6-tertiary-butyl phenol) | 1 |
| Sulphur | 2.5 |
| Zinc oxide | 3 |
| Ammonia | 1 |
| Potassium hydroxide | 0.1 |
| Filler (alkali aluminum silicate clay) | 100 |
| Carbon black | 0.2 |
| Water | To 75 weight % solids |

The latex was a 68 percent total solids content latex of a rubbery copolymer of styrene and butadiene containing 27 percent polymerized styrene. It had a pH of 11.6 and a viscosity of 3,000 centipoises. Gelation was carried out by adding 3.5 parts by weight of a 60/40 mixture of ammonium acetate and sodium silicofluoride to the foamed compound.

EXAMPLE 1

Compound (A) was foamed to two times its original volume and applied by means of a lick-roller and doctor knife to the underside of a tufted carpet which was being passed continuously through the carpet backing equipment. The application weight varied within the range of 4–6 dry weight ounces per square yard of carpet (136–204 grams per square meter). The foam coated carpet was then passed under a battery of infra-red lamps which caused rapid drying and deposition onto the back of the carpet of a thin layer of compound from which substantially all of the water was evaporated. After leaving the infra-red heating zone, the underside of the carpet was coated with a layer of foam rubber backing compound (C) which had been foamed to about 3.5 times its original volume and designed to give a high density foam rubber carpet cushion. Foamed compound (c) had a density of 25 pounds per cubic foot (400 grams per liter) and was applied so as to provide 55 ounces of foam rubber per square yard of carpet (1870 grams per square meter) after drying. The carpet was then passed through a drier to dry and vulcanize the foamed layer. It was found that all of the foregoing steps could be carried out readily while the carpet was passed only once through the foam backing equipment. The interfacial structure between the carpet and the foam rubber was considered to be good.

EXAMPLE 2

The procedure of Example 1 was repeated except that the foamed precoat layer was not subjected to the drying step before applying the final foam backing layer. In other words, foamed compound (C) was applied directly onto the wet layer of foamed precoat compound (A) and the two wet foam layers were dried simultaneously.

Good throughput rates and interfacial structures were obtained.

EXAMPLE 3

The procedure of Example 1 was repeated except that precoat compound (B) was used. It was applied in a liquid state as practised in the prior art with the application weight varying between 13–15 ounces dry weight per square yard of carpet (442–510 grams per square meter). The drying rate of this precoat layer was two to three times slower than that of the foamed precoat of Example 1.

EXAMPLE 4

In a commercial scale test, a carboxy-modified latex similar to that used in compound (B) was compounded with 0.85 part dry weight of polyacrylate thickener and 0.75 part dry weight foaming agent per 100 parts dry weight of latex, foamed to a density of 400 grams per liter and applied as a precoat to the underside of a carpet. Application weight was 2–3 dry weight ounces per square yard of carpet (68–102 grams per square meter). After a partial drying under a bank of infra-red lamps, a final foamed latex backing layer was applied over the precoat layer. The final foam latex backing compound was prepared by compounding a latex similar to that used in preparing the precoat compound with 5.0 parts foaming agent, 10.0 parts polystyrene latex, 125 parts ground limestone, 25 parts ground marble, 2.5 parts wax emulsion, 0.1 part methyl cellulose, 0.25 part carbon black pigment and 9.0 parts cure paste per 100 parts latex, all parts being calculated on a dry weight basis. The final foam latex backing layer was foamed to a density of 175 grams per liter and applied in the amount of about 18 ounces per square yard of carpet (612 grams per square meter) and a thickness of about three-sixteenths inch (about 4.8 millimeters). The coated carpet was next passed under a battery of infra-red heating lamps to set and partially dry the foamed latex and immediately afterwards it was passed through a 108 foot long drying oven maintained at 160°C at the rate of 16 feet per minute. The resulting carpet had good tuft lock and the interfacial structure was considered to be perfect.

When the above procedure was carried out with the same materials but with the precoat being applied in the unfoamed liquid form at about 15 ounces per square yard of carpet according to the prior art procedure, the interfacial structure was considered to be unacceptable.

What is claimed is:

1. A process for producing a foam rubber-backed carpet comprising precoating the underside of the carpet with a thin layer of a foamed latex comprising a rubbery polymer and from less than 100 to 0 parts of filler per 100 parts by weight of rubbery polymer, said precoating being applied in amount of 2 – 6 ounces dry weight per square yard of carpet, removing 0 – 100 percent of the water in said precoat layer, applying over the precoat layer a thick backing layer of a foamed latex comprising a rubbery polymer, filler and a vulcanizing agent for the rubbery polymer, and drying and vulcanizing said backing layer, said foamed backing latex being different from said foamed precoat latex.

2. A process as claimed in claim 1 wherein the foamed precoat layer is at least partially dried before the foamed latex backing layer is applied.

3. A process as claimed in claim 2 wherein the foamed precoat layer is dried to substantially complete dryness before the foamed backing layer is applied.

4. A process as claimed in claim 2 wherein the carpet is a tufted carpet.

5. A process as claimed in claim 2 wherein the carpet is a tufted carpet and the foamed precoat layer is compounded with less than 50 parts of filler per 100 parts by weight of rubbery polymer.

6. A process as claimed in claim 2 wherein the carpet is a tufted carpet, the foamed precoat layer contains no filler and is applied in an amount of 3 – 5 dry weight ounces per square yard of carpet.

7. A process as claimed in claim 2 wherein the foamed precoat layer comprises a latex of a rubbery diene polymer, said latex being compounded so as to comprise a thickener and less than 50 parts of filler per 100 parts by weight of rubbery polymer.

8. A process as claimed in claim 2 wherein the polymer in the foamed precoat layer is a carboxy-modified rubbery copolymer of butadiene and styrene.

9. A foam rubber-backed carpet prepared according to the process as claimed in claim 2.

* * * * *